United States Patent
Song et al.

(10) Patent No.: US 7,593,402 B2
(45) Date of Patent: Sep. 22, 2009

(54) METHOD OF MULTICAST SOURCE FILTERING

(75) Inventors: Xiaofeng Song, Shenzhen (CN);
Xiaodan Chen, Shenzhen (CN);
Hongke Zhang, Shenzhen (CN); Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 474 days.

(21) Appl. No.: 11/518,325

(22) Filed: Sep. 8, 2006

(65) Prior Publication Data

US 2007/0064695 A1  Mar. 22, 2007

Related U.S. Application Data

(63) Continuation of application No. PCT/CN2006/000129, filed on Jan. 24, 2006.

(30) Foreign Application Priority Data

Feb. 4, 2005  (CN) .................. 2005 1 0052305

(51) Int. Cl.
*H04L 12/56* (2006.01)
(52) U.S. Cl. ..................... 370/390; 370/432
(58) Field of Classification Search .............. None
See application file for complete search history.

(56) References Cited

U.S. PATENT DOCUMENTS

| | | | |
|---|---|---|---|
| 6,324,575 B1 | 11/2001 | Jain et al. | |
| 6,389,475 B1 | 5/2002 | Speakman et al. | |
| 2004/0158872 A1* | 8/2004 | Kobayashi | 725/120 |
| 2006/0146857 A1* | 7/2006 | Naik et al. | 370/432 |
| 2006/0274720 A1* | 12/2006 | Adams et al. | 370/351 |

\* cited by examiner

*Primary Examiner*—Gregory B Sefcheck
(74) *Attorney, Agent, or Firm*—Leydig, Voit & Mayer, Ltd.

(57) ABSTRACT

A method for filtering multicast sources, so that when the multicast routing protocol is based on the Source-Specific Multicast (SSM) model, resource consumption of inquiry routers can be reduced and the multicast packet forwarding efficiency can be improved. In the present invention, the inquiry router determines whether it is the Any-Source Multicast (ASM) model or the SSM model that the multicast routing protocol running in the network is based on. If it is the ASM model, maintain the source filtering method in the related art. If it is the SSM model, cancel the source filtering process or only performing the source filtering process in the inclusive mode. In the situation that only the source filtering process in the inclusive mode is performed, the additional filtering mode switching function or static configuration by software guarantees that the inquiry router is only in the inclusive mode, thereby avoiding the mode switching.

17 Claims, 5 Drawing Sheets

METHOD OF MULTICAST SOURCE FILTERING

This application is a continuation of International Patent Application No. PCT/CN2006/000129, filed Jan. 24, 2006, which claims priority to Chinese Patent Application No. 200510052305.8, filed Feb. 4, 2005, all of which are hereby incorporated by reference.

FIELD OF THE TECHNOLOGY

The present invention relates to packet multicast techniques, more particularly, to a method of multicast source filtering in different multicast protocol models.

BACKGROUND OF THE INVENTION

Ever since the 1990s, many countries all over the world have paid much attention to information and information industries, which greatly promoted the development of information technologies. With the popularity of the Internet, the population surfing the Internet is increasing in exponential terms. And with the increase of network bandwidth, the advancement of computer hardware and software technologies as well as the requirements of human beings, societies and economies, multimedia services is taking a larger and larger proportion on the Internet. High-bandwidth multimedia applications, such as video conference, video on demand, multimedia remote education and remote consultation, occupy a great part of the network resources, and the massive voice and video data deteriorate the congestion of the network. The cause is that the data is transmitted by point-to-point unicast, and a source node must establish a connection for each session to transmit the data, therefore, there are large amounts of duplicated data on the backbone network, which leads to the decrease of communication efficiency, and also aggravates the load of the network. If broadcast is adopted, an Internet Protocol (IP) packet can be transmitted to all the hosts on one segment, but since not all the hosts need the packet, and the broadcast is also limited within one segment, it can not satisfy the requirement of the multimedia applications. In such a situation, multicast emerges.

Multicast is a network technology which allows one or more hosts, as multicast source(s), to transmit a single data packet to multiple hosts. Comparing with the unicast, no matter how many receivers there are on the link, the data packet is transmitted only once. The data packet is duplicated only at an intersection of different receivers. By the traditional unicast technique, the data source has to send as many copies of the data packet as the number of the receivers. Therefore, multicast is a more reasonable data transmission technique, applicable in point-to-multipoint or multipoint-to-multipoint application environments. When a host desires to receive multicast data, it joins a multicast group at first, which is identified by a Class D IP address. After a multicast router receives the message indicating that the host has joined in the multicast group, it establishes a multicast tree between a transmitter and the receiver so as to lead the multicast data to reach the receiver. When the receiver does not exist any more, the multicast router will remove the connection between the multicast source and the receiver.

There are two kinds of IP multicast service models: Any-Source Multicast (ASM) and Source-Specific Multicast (SSM).

In the ASM model, the packet is transmitted to a host group, wherein, the host group refers to a group of hosts or routers which are identified by a group address G. A receiver can receive the IP packet just by requesting to join the group. The ASM adopts the group address G to identify a multicast group, and each group can have any number of sources and receivers, and a source can be a receiver at the same time.

In the SSM model, a pair of multicast source address S and multicast address G (S, G) is used to identify a session, also called a channel. A receiver needs to know not only the multicast address G, but also the multicast source address S. The packet is transmitted from a specific source S to an SSM multicast address G. A receiver can receive the IP packet by subscribing to the channel (S, G). The multicast source address S and the multicast address G are used to identify a multicast group, and each channel can have only one specific source and any number of receivers.

Early versions of the multicast routing protocols are designed following the ASM model. In this model, a receiver cannot designate packets from which source are desired when it joins a group, thus it will receive all the packets transmitted to the group from any source. However, the bandwidth of the link between a host and its neighbor router is limited, if the group has many sources, it is not only a waste of the bandwidth, but also possibly causes network congestion. Therefore, the ASM model is not suitable for commercial applications. In practical applications, a majority of multimedia services are source-specific; therefore, there emerges multicast routing protocols based on the SSM model, such as Protocol Independent Multicast-Source Specific Multicast (PIM-SSM), which is provided by the Internet Engineering Task Force (IETF) based on a Protocol Independent Multicast-Sparse Mode (PIM-SM).

However, in order to support the multicast routing protocols based on the SSM model, irrelevant sources must be filtered. Therefore, new versions of the group management protocols, such as Internet Group Management Protocol version 3 (IGMPv3) and Multicast Listener Discovery version 2 (MLDv2), are all equipped with source filtering abilities. There are two source filtering modes: inclusive mode and exclusive mode. The inclusive mode means to only receive packets transmitted to the multicast addresses that are included in a source list. The exclusive mode means to only receive packets transmitted to the multicast addresses that are not included in the source list.

Taking the MLDv2 described in the RFC3810 as an example, the source filtering mode of each interface of the multicast router is determined by the source filtering modes of all the multicast receiving hosts in the subnet directly connected to the interface, the switching will take place when a state change report is received from the receiving host or when the timer expires.

SUMMARY OF THE INVENTION

The present invention provides a method for filtering multicast sources, so that when a Source-Specific Multicast (SSM) model is adopted, resources of inquiry routers can be reserved, and packet forwarding efficiencies can be improved.

A method of multicast source filtering includes the following steps:

an inquiry router determining whether a multicast routing protocol is based on a SSM model;

if it is based on the SSM model, the inquiry router directly forwarding a multicast data packet, or performing an inclusive mode source filtering upon the multicast data packet and forwarding the packet.

It can be seen by comparing the technical scheme of the present invention with that in the related art that, the main difference is that, the present invention determines whether the multicast routing protocol running in the network is based on the SSM model. It cancels the source filtering process, or just performs an inclusive mode source filtering for the multicast routing protocol based on the SSM model.

The technical scheme difference brings out obvious favorable effects, i.e., in the present invention, when the multicast routing protocol is based on the SSM model, it is unnecessary for the inquiry router to perform the source filtering upon the multicast data packet or switch the filtering mode, thereby reducing the load and the memory consumption of the inquiry router, and improving the packet forwarding efficiency of the inquiry router.

DETAILED DESCRIPTION OF THE INVENTION

The present invention will be described in detail hereinafter with reference to the embodiments and accompanying drawings.

In the IP multicast model, group management protocols are adopted for interactions between multicast receivers and multicast routers. The multicast receiver can dynamically inform the multicast router in its subnet of packets that from which sources and to which multicast addresses are desired. Accordingly, the multicast router can dynamically know that the multicast receivers in the subnet are interested in packets that are from which sources and to which multicast addresses. The group management protocols are divided into two kinds: IGMP and MLD. Wherein, the IGMP aims at the Internet Protocol version 4 (IPv4), and there exists three versions: IGMPv1, IGMPv2, IGMPv3. The MLD is a group management protocol aiming at the IPv6, and there exists two versions: MLDv1, MLDv2. In addition, multicast routing protocols are adopted between routers to establish and update multicast trees, according to which the router can get paths for duplicating and distributing multicast packets. Databases collected by the group management protocols are used by the multicast routing protocols to determine whether any receiver exists in local subnets, thereby guaranteeing the multicast receivers to receive their desired multicast packets.

An upper layer protocol or an application program of the receiving host can activate or prevent the packet destined to a specific IP multicast address through an IP multicast service interface provided by the IP layer. The IP multicast service interface can be represented by the following interface function:

IPMulticastListen (socket, interface, multicast address, source filtering mode, source list)

While utilizing the above-mentioned interface function, as to a given combination of the {socket, interface, multicast address}, only one source filtering mode and its corresponding source list can be activated at one time. But each time the interface function is called, the source filtering mode and its corresponding source list of the receiving host under this combination may be changed.

The above-mentioned interface function provided by the IP multicast service interface supports early versions of the group management protocols. For instance, when the IGMPv1, IGMPv2 or MLDv1 are adopted, the operation of joining the multicast group G is equivalent to that of calling the IPMulticastListen (socket, interface, G, inclusive mode, {null}), while the operation of leaving the multicast group G is equivalent to that of calling the IPMulticastListen (socket, interface, G, exclusive mode, {null}).

States of different layers at a multicast receiving host side and a multicast router side while running the IGMPv3 and the MLDv2 will be illustrated hereinafter with reference to FIG. 1.

Figure 1:
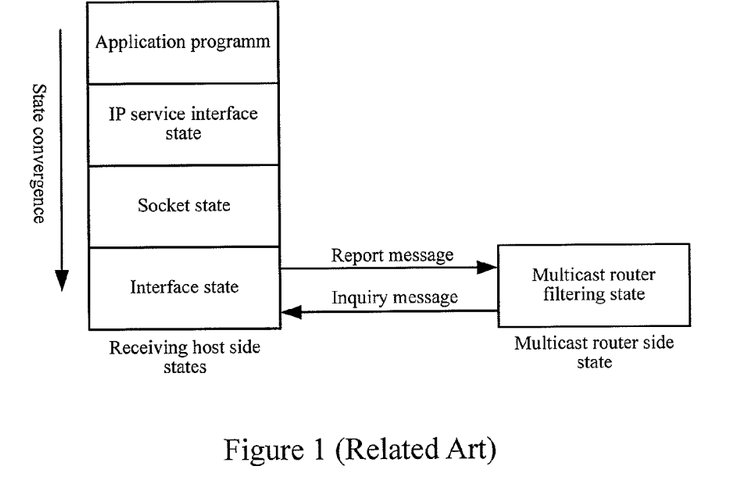
FIG. 1 is a diagram illustrating states at a multicast receiving host side and a multicast router side when running the IGMPv3 or the MLDv2 protocol according to the related art.

As shown in FIG. 1, under the application layer at the multicast receiving host side, there maintains an IP service interface state, a socket state and an interface state. Wherein, the socket state is a multicast receiving state which includes {interface, multicast address, source filtering mode, source list} and is maintained by the socket layer for each interface and multicast address. The IP service interface state is a multicast receiving state maintained by the IP layer for each multicast address on each interface after the socket states is converged, including {multicast address, source filtering mode, source list}.

The multicast router side only includes a multicast router filtering state, which is a multicast receiving state maintained by the IP layer for each multicast address at each interface, including {multicast address, source filtering mode, filter timer, source list}, wherein, a timer is configured for each source in the source list. As to each multicast address, the source filtering mode of the multicast router interface is determined by the source filtering modes of all the multicast receiving hosts in the subnet directly connected to the interface. The multicast receiving host will send a "state change report" to the multicast router as soon as any change takes place to the multicast receiving state in the interface layer. And the multicast router calculates and updates the multicast receiving state of the interface which receives the report, including the switching of the source filtering mode. In addition, the multicast receiving state of the multicast router can also be changed when the timer expires.

The methods of switching the multicast source filtering mode provided by the IGMPv3 and MLDv2 in the related art is described in the RFC3376 and RFC3810 respectively.

Taking the MLDv2 described in the RFC3810 as an example, the source filtering mode of each interface of the multicast router is determined by the source filtering modes of all the multicast receiving hosts in the subnet directly connected to the interface, the switching will take place when a state change report is received from the receiving host or when the timer expires.

Specifically, as to a certain multicast address, if all the receiving hosts in the subnet are in the inclusive mode, the multicast router is in the inclusive mode. If only one receiving host in the subnet is in the exclusive mode, the multicast router is in the exclusive mode at the interface. There are two lists when it is in the exclusive mode, a request list and an exclusive list. Wherein, the request list has no effect on the exclusive-mode forwarding and is taken as an initial inclusive list when it is switched back to the inclusive mode.

When the multicast router receives the state change report from the receiving host or when the timer expires, the source filtering mode of the multicast router will be switched. The specific procedure is as follows, for instance, all the receiving hosts directly connected to the multicast router are in the inclusive mode, which means that the multicast router is in the inclusive mode. But if any receiving host is switched to the exclusive mode, it will send a state change report to the multicast router, then it is determined that the multicast router is in the exclusive mode. After the interface of the multicast router is switched to the exclusive mode, a filter timer will be set for this multicast address, and will be reset when there is any exclusive mode state report. When the filter timer expires, it means that there is no receiving host operating in the exclusive mode, and the router will automatically switch back to the inclusive mode and take the request list as the initial inclusive list, so as to avoid the data forwarding from being interrupted due to the switch.

Figure 2:
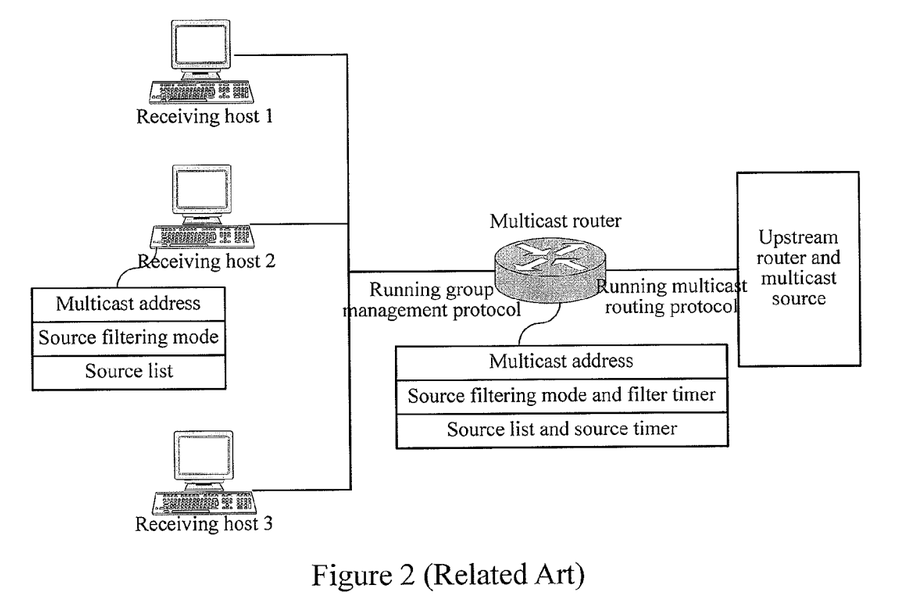
FIG. 2 is a flowchart illustrating a source filtering process of the IGMPv3 or the MLDv2 according to the related art.

The source filtering process in the IGMPv3 or MLDv2 will be illustrated hereinafter with reference to FIG. 2. As shown in FIG. 2, the multicast router maintains such items as multicast address, source filtering mode and filtering timer, source list and source timer, etc., while each receiving host maintains such items as multicast address, source filtering mode, source list, etc. The multicast packet destined to a certain multicast address will be forwarded to the local link after being filtered by the inquiry router. The receiving host performs the source filtering process upon the multicast packet at corresponding interface, then transmits the multicast packet to the socket layer for source filtering, and finally transmits the packet to the application program.

However, it is determined whether the multicast routing protocol running in the network is based on the ASM model or the SSM model in the embodiments of the present invention, and different source filtering methods are adopted for them. The source filtering method for the multicast routing protocols based on the ASM model is not confined herein, the existing method can still be used. However, as to the multicast routing protocols based on the SSM model, the source filtering process is not performed or only the inclusive mode source filtering process is performed.

Since two different processing methods are adopted for the multicast routing protocols based on the SSM model, i.e., performing no source filtering or only performing the inclusive source filtering, a general process of the multicast source filtering will be illustrated with reference to FIG. 3. And the two different processing methods will be illustrated hereinafter with reference to FIG. 4 and FIG. 5 respectively.

Figure 3:
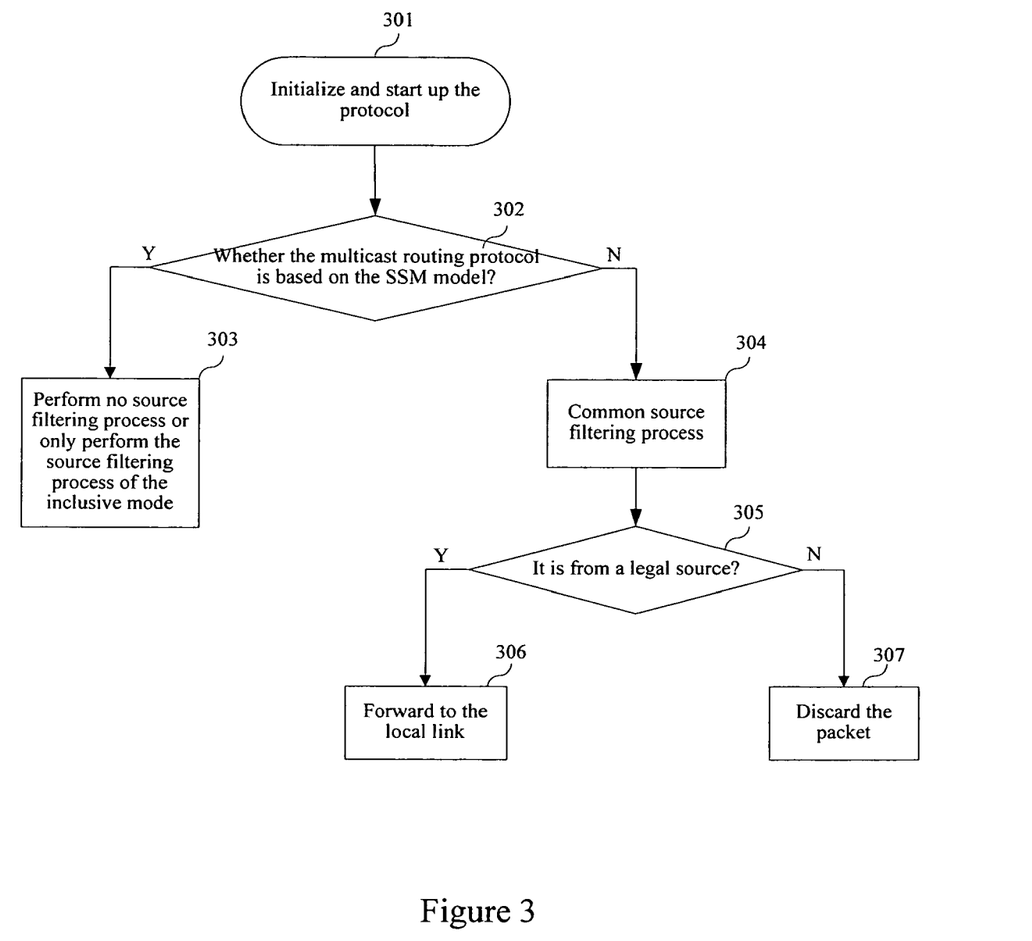
FIG. 3 is a general flowchart illustrating a source filtering process of an inquiry router according to an embodiment of the present invention.

Supposing that the group management protocol IGMPv3 or MLDv2, which has the source filtering ability, is running between a receiving host and a multicast router and at this time an inquiry router enters the process as shown in FIG. 3.

Step 301, the inquiry router initializes and starts up the protocol.

Step 302, the inquiry router judges whether the multicast routing protocol is based on the SSM model, if it is, execute step 303; otherwise, execute step 304.

Step 303, one of the two processing methods is adopted to process the multicast data packet under the multicast routing protocol based on the SSM model. Wherein, the two processing methods are: performing no source filtering and only performing the inclusive mode source filtering, which will be illustrated with reference to FIG. 4 and FIG. 5 respectively hereinafter.

If the multicast routing protocol is based on the ASM model, step 304 will be executed.

Step 304, the inquiry router performs the common source filtering process upon the arrived multicast data packet. Wherein, the common source filtering refers to that in the related art, i.e. the source filtering, including the inclusive mode and the exclusive mode. Whether to adopt which mode is determined by the source filtering modes of all the multicast receiving hosts in the subnet. The processing method for the multicast routing protocol based on the ASM model is not confined herein.

Step 305, determine whether the multicast data packet is from a legal source address, if it is, execute step 306 to forward the data packet to the local link; otherwise execute step 307 to discard the data packet.

As to the receiving host, it is unnecessary to differentiate the type of the multicast routing protocol running in the network; it can perform multicast source filtering in the IP layer, the socket layer and the application layer completely following the method provided by the MLDv2 and the IGMPv3.

One of the two methods, i.e. the method of performing no source filtering process, will be illustrated hereinafter with reference to FIG. 4.

Step 401, the inquiry router initializes and starts up the protocol.

Step 402, the inquiry router determines whether the multicast routing protocol is based on SSM model or not, if it is, execute step 403; otherwise, execute step 404.

Step 403, the inquiry router only checks the multicast address of the arrived multicast data packet, but not checking or filtering the multicast source, and directly forwards the data packet to the local link. The reason is that if the multicast routing protocol based on the SSM model is adopted, all the multicast data packets arriving at the inquiry router should be sent from legal sources which are applied by the receiving hosts. Therefore, it is unnecessary for the inquiry router to perform the source filtering.

If the multicast routing protocol is based on the ASM model, step 404 will be executed.

Step 404, the inquiry router performs the common source filtering process upon the arrived multicast data packet. Wherein, the common source filtering refers to that in the related art, i.e. the source filtering including the inclusive mode and the exclusive mode. Whether to adopt which mode is determined by the source filtering modes of all the multicast receiving hosts in the subnet. The processing method for the multicast routing protocol based on the ASM model is not confined herein.

Step 405, the inquiry router judges whether the multicast data packet is from a legal source address, if it is, execute step 406 to forward the data packet to the local link; otherwise, execute step 407 to discard the data packet.

Figure 4:
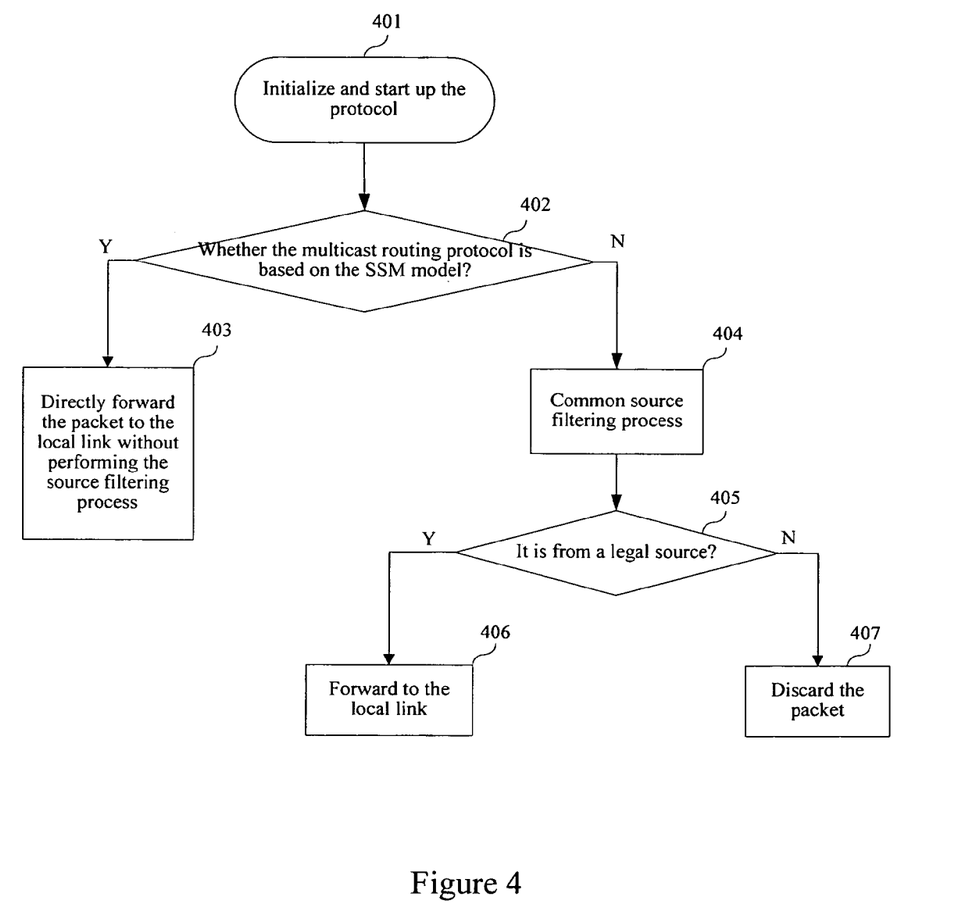
FIG. 4 is a flowchart illustrating a process when the inquiry router does not perform the source filtering process under the routing protocol based on the SSM model according to an embodiment of the present invention.
Figure 5:
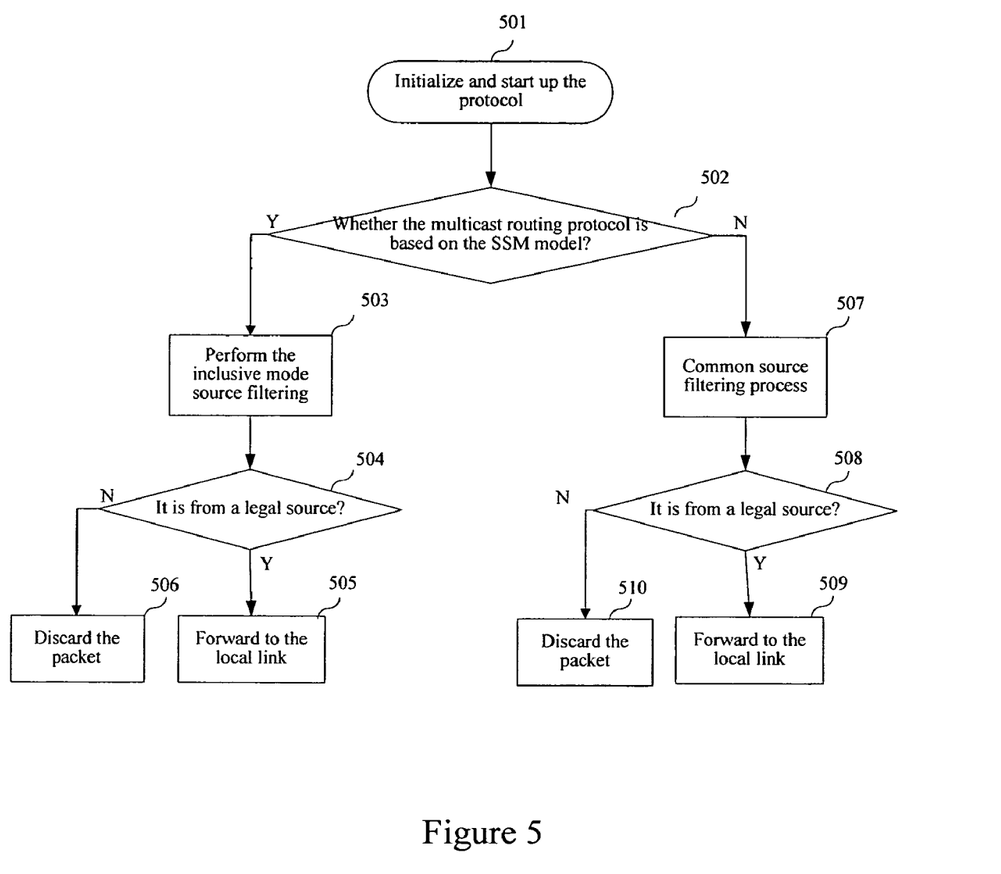
FIG. 5 is a flowchart illustrating a process when the inquiry router only performs the inclusive mode source filtering process under the routing protocol based on the SSM model according to an embodiment of the present invention.

The method as shown in FIG. 4 is simple and clear, but in practical applications, for the sake of security and compatibility, the inquiry router can still perform source filtering process upon the multicast data packets under the multicast routing protocol of the SSM model. But at this time, the process is a source filtering process only with the inclusive mode, and the mode switching is not needed. The process is shown in FIG. 5.

Step 501, the inquiry router initializes and starts up the protocol.

Step 502, the inquiry router determines whether the multicast routing protocol is based on the SSM model, if it is, execute step 503; otherwise, execute step 507.

Step 503, the inquiry router performs the inclusive mode source filtering process upon the arrived multicast data packet. Even if the multicast routing protocol based on the SSM model is adopted, the inclusive mode source filtering can completely satisfy the requirement without switching to the exclusive mode, i.e., it is unnecessary for the inquiry router to switch modes.

Step 504, the inquiry router judges whether the multicast data packet is from a legal source address, if it is, execute step 505 to forward the data packet to the local link; otherwise, execute step 506 to discard the data packet.

If the multicast routing protocol is based on the ASM model, step 507 will be executed.

Step 507, the inquiry router performs the common source filtering process upon the arrived multicast data packet. Wherein, the common source filtering refers to that as in the related art, i.e. the source filtering including the inclusive mode and the exclusive mode. Whether to adopt which mode is determined by the source filtering modes of all the multicast receiving hosts in the subnet. The processing method for the multicast routing protocol based on the ASM model is not confined herein.

Step 508, the inquiry router judges whether the multicast data packet is from a legal source address, if it is, execute step 509 to forward the data packet to the local link; otherwise, execute step 510 to discard the data packet.

In step 503, only the inclusive mode source filtering process is performed upon the arrived multicast data packets. In order to guarantee that the inquiry router does not switch to the exclusive mode, two methods are provided to avoid the switching of the source filtering mode when receiving an exclusive mode report from the receiving host.

Figure 6:
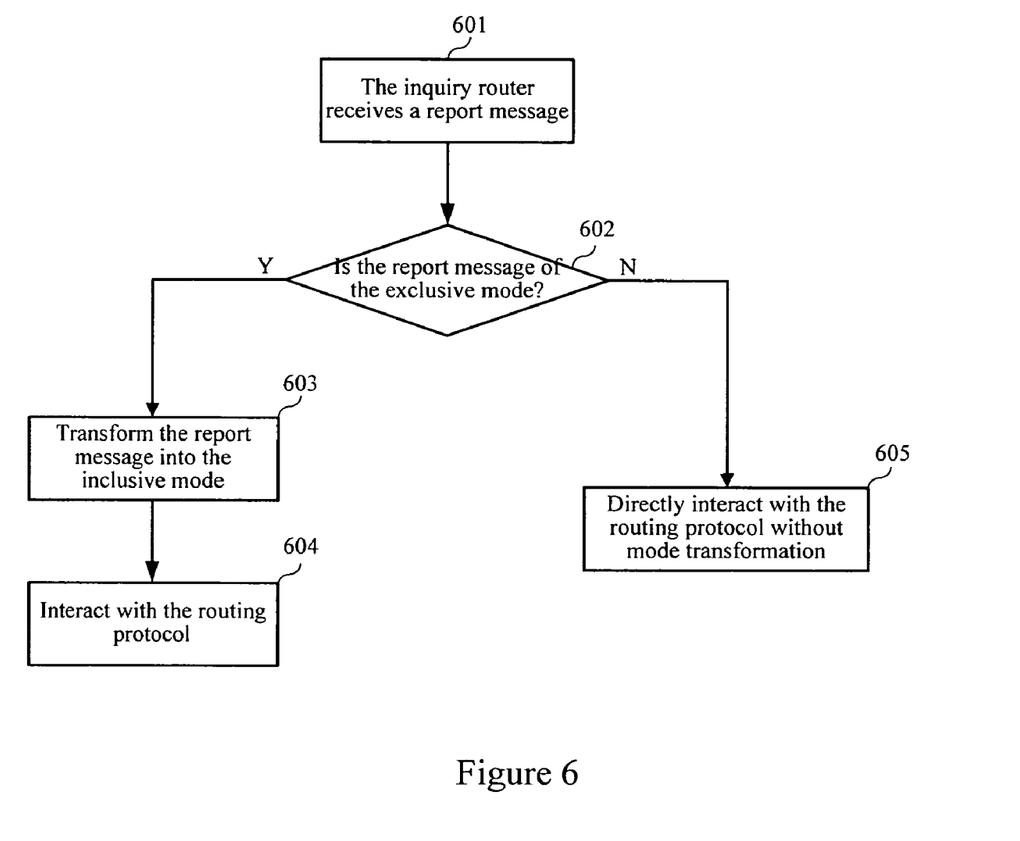
FIG. 6 is a flowchart illustrating a process of switching the mode of a report message under the routing protocol based on the SSM model according to an embodiment of the present invention.

One method is to add a filtering mode switching function to the interface of the inquiry router, as shown in FIG. 6. The filtering mode switching function is enabled only when the multicast routing protocol based on the SSM model is running in the network, but not enabled when the multicast routing protocol based on the ASM model is running in the network.

Step 601, the inquiry router receives an IGMPv3 or MLDv2 report message.

Step 602, the inquiry router judges the mode of the report message, if it is the inclusive mode, execute step 603; otherwise, execute step 605.

Step 603, the inquiry router switches the filtering mode of the report message to the inclusive mode, so as to make sure that the inquiry router is always in the inclusive mode and will not switch to the exclusive mode even if an exclusive mode report message from the receiving host is received. It can be understood by those skilled in the art that, the group management protocol MLDv2 and IGMPv3 with the source filtering ability have six types of protocol messages altogether, among which two types, i.e. MODE_IS_EXCLUDE and CHANGE_ TO_EXCLUDE_MODE, belong to the exclusive mode messages and need to be switched. The MODE_IS_EXCLUDE message and the CHANGE_TO_EXCLUDE_ MODE message are represented by symbols IS_EX (S) and TO_EX (S) respectively, wherein S denotes the source address. The exclusive mode message is transformed into the inclusive mode message according to the source list in the multicast receiving state. The specific procedure of switching the filtering mode is as follows: when the inquiry router receives the IS_EX (S1) or the TO_EX (S1) exclusive mode message from a host X, it calculates the supplementary set (S2, S3 . . . Sn) of the source S1 according to source list of the inquiry router itself (S1, S2, S3 . . . Sn), and takes the supplementary set as the source list parameter for the transformed inclusive mode message.

After switching the filtering mode, step 604 will be executed.

Step 604, perform a message interaction between the report message and the routing protocol.

If the report message received by the inquiry router at the very start is of the inclusive mode, execute step 605.

Step 605, directly perform the message interaction between the report message and the routing protocol without switching the mode of the message.

In addition, there is a second method, i.e., guarantee that the inquiry router only performs the inclusive mode source filtering process through static configurations by software.

In this method, a multicast service provider releases multicast service application software with different configurations according to whether it is the ASM model or the SSM model that the multicast routing protocol running in the network is based on.

If it is the ASM model, the software calls standard application program interface IPMulticastListen, wherein, the filtering mode can be chosen as the inclusive mode or the exclusive mode, so that the receiving host can send joining-in, leaving and member relationships report messages of the source filtering inclusive mode or the source filtering exclusive mode to the inquiry router.

If it is the SSM model, the software calls standard application program interface IPMulticastListen, wherein, the filtering mode is confined to the inclusive mode, so that the receiving host can only send joining-in, leaving and member relationships report messages of the source filtering inclusive mode to the inquiry router.

Although the present invention has been shown and described with reference to the preferred embodiments, it will be understood by those skilled in the art that various changes in form and in detail may be made without departing from the spirit and the protection scope of the present invention as defined by the appended claims.

What is claimed is:

1. A method of multicast source filtering, comprising:
an inquiry router determining whether a multicast routing protocol is based on a Source-Specific Multicast (SSM) model;
if it is based on the SSM model, the inquiry router directly forwarding a multicast data packet, or performing an inclusive mode source filtering upon the multicast data packet and forwarding the packet; and when receiving an exclusive mode report message, the inquiry router initiating a mode switching function in the SSM model, and transforming the exclusive mode report message into an inclusive mode report message.

2. The method according to claim 1, wherein, the type of the exclusive mode report message is "MODE_IS_EXCLUSIVE" or "CHANGE_TO_EXCLUDE_MODE", the parameter of the message is a source address in the exclusive mode.

3. The method according to claim 2, wherein, the method is applicable to any one of: IGMPv3 with source filtering abilities, and MLDv2 with source filtering abilities.

4. The method according to claim 2, wherein, the method is applicable to any one of: IPv4 and IPv6.

5. The method according to claim 1, wherein, the exclusive mode report message is transformed into an inclusive mode report message by obtaining a supplementary set of source addresses in the exclusive mode in a source list of the inquiry router.

6. The method according to claim 5, wherein, the method is applicable to any one of: IGMPv3 with source filtering abilities, and MLDv2 with source filtering abilities.

7. The method according to claim 5, wherein, the method is applicable to any one of: IPv4 and IPv6.

8. The method according to claim 1, wherein, through preset configurations, the inquiry router can only call the source filtering process of the inclusive mode.

9. The method according to claim 8, wherein, the method is applicable to any one of: IGMPv3 with source filtering abilities, and MLDv2 with source filtering abilities.

10. The method according to claim 8, wherein, the method is applicable to any one of: IPv4 and IPv6.

11. The method according to claim 1, further comprising:
if the multicast routing protocol is based on an Any-Source Multicast (ASM) model, the inquiry router performing a common source filtering process upon the multicast data packet, wherein, the mode of the common source filtering process is switched between the inclusive mode and the exclusive mode.

12. The method according to claim 1, wherein, the method is applicable to any one of: Internet Group Management Protocol version 3 (IGMPv3) with source filtering abilities, and Multicast Listener Discovery version 2 (MLDv2) with source filtering abilities.

13. The method according to claim 1, wherein, the method is applicable to any one of: IGMPv3 with source filtering abilities, and MLDv2 with source filtering abilities.

14. The method according to claim 1, wherein, the method is applicable to any one of: Internet Protocol version 4 (IPv4), and Internet Protocol version 6 (IPv6).

15. The method according to claim 1, wherein, the method is applicable to any one of: IPv4 and IPv6.

16. The method according to claim 1, wherein, the inquiry router determines whether the multicast routing protocol is based on the SSM model during initialization.

17. The method according to claim 1, further comprising: if the multicast routing protocol is not based on the SSM model, determining whether to adopt the inclusive mode or the exclusive mode to filter the sources according to source filtering modes of all receiving hosts in the subnet.

* * * * *